July 17, 1956
C. H. MAY
2,754,691
VARIABLE GEAR RATIO POWER TRANSMISSION APPARATUS
Filed March 17, 1951
7 Sheets-Sheet 3
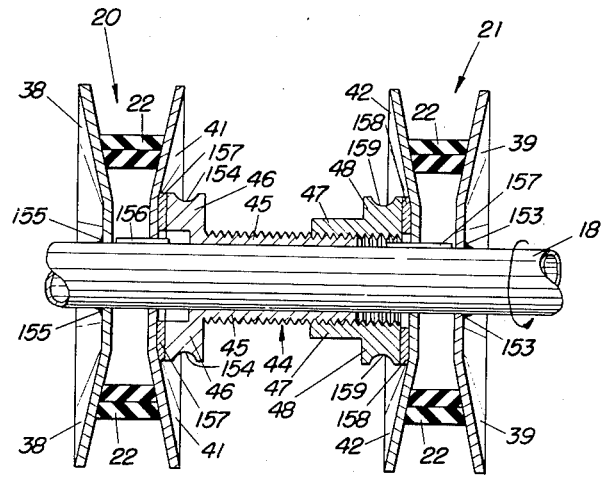
FIG. 4
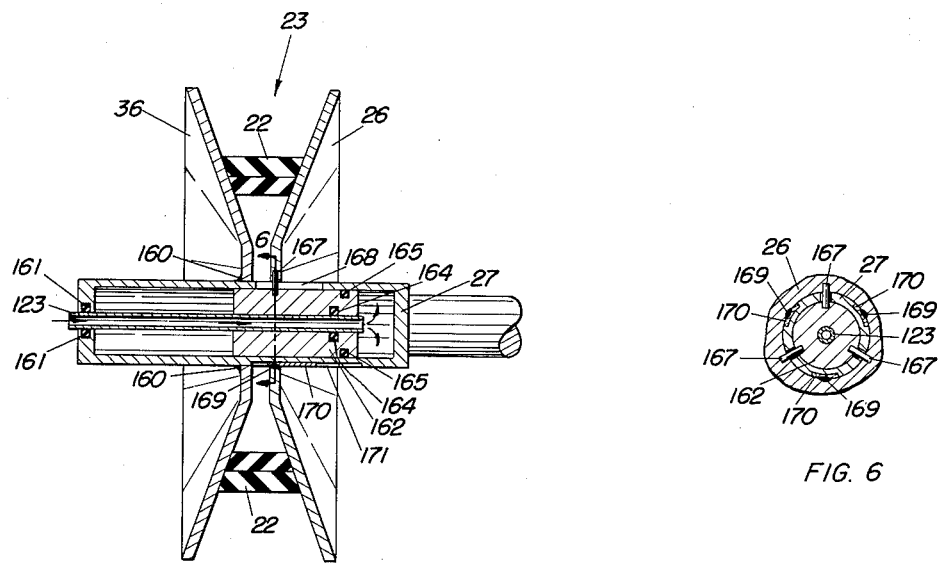
FIG. 5
FIG. 6
INVENTOR.
Claude Hector May
BY Adams, Stevens and Mase
AGENTS July 17, 1956 C. H. MAY 2,754,691
VARIABLE GEAR RATIO POWER TRANSMISSION APPARATUS
Filed March 17, 1951 7 Sheets-Sheet 4
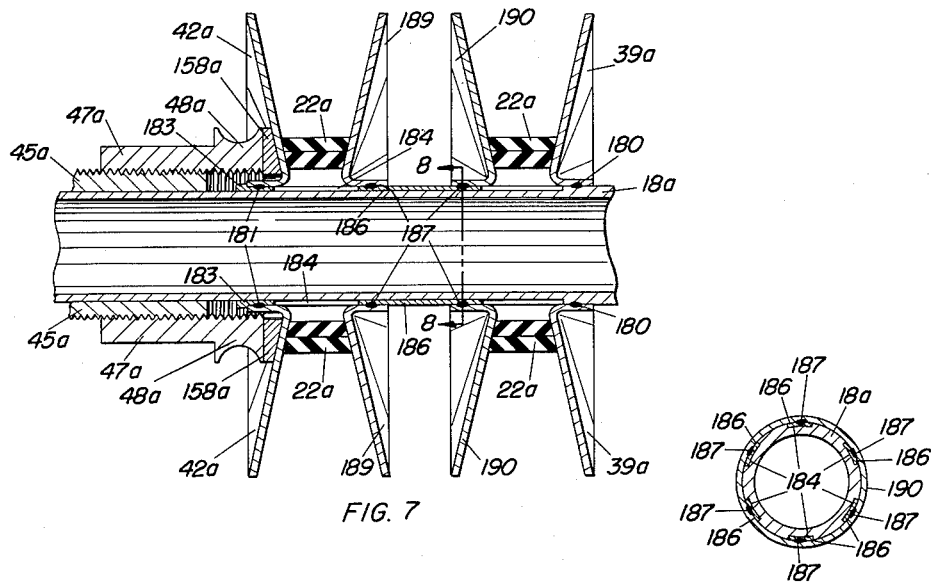
FIG. 7
FIG. 8
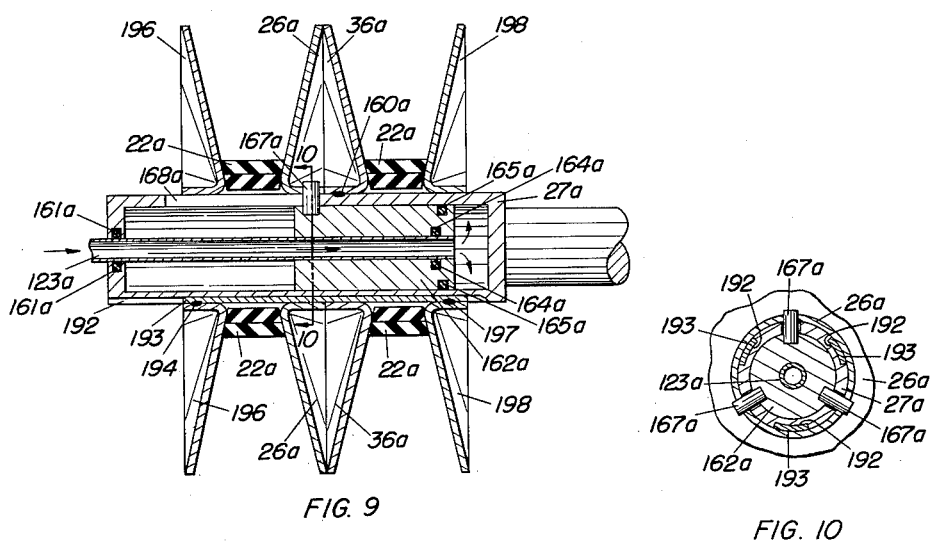
FIG. 9
FIG. 10
INVENTOR.
Claude Hector May
BY Adams, Stevens and Mase
AGENTS.

July 17, 1956

C. H. MAY 2,754,691

VARIABLE GEAR RATIO POWER TRANSMISSION APPARATUS

Filed March 17, 1951

INVENTOR.
Claude Hector May

BY Adams, Stevens and Mase

AGENTS.

July 17, 1956 C. H. MAY 2,754,691
VARIABLE GEAR RATIO POWER TRANSMISSION APPARATUS
Filed March 17, 1951 7 Sheets-Sheet 6

INVENTOR.
Claude Hector May
BY Adams, Stevens and Mase
AGENTS.

July 17, 1956  C. H. MAY  2,754,691
VARIABLE GEAR RATIO POWER TRANSMISSION APPARATUS
Filed March 17, 1951  7 Sheets-Sheet 7
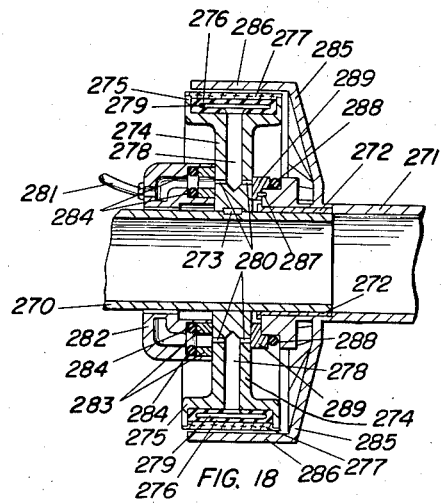
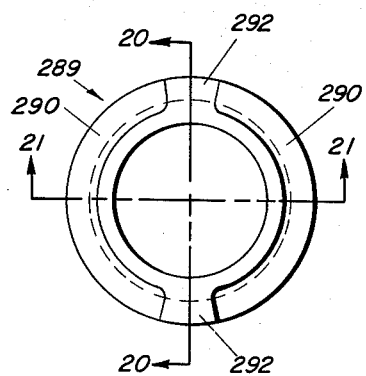
FIG. 19
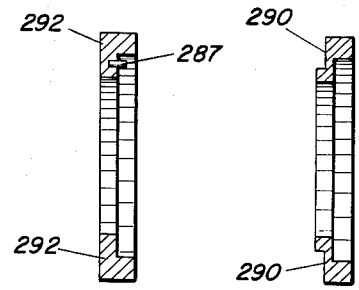
FIG. 20
FIG. 21
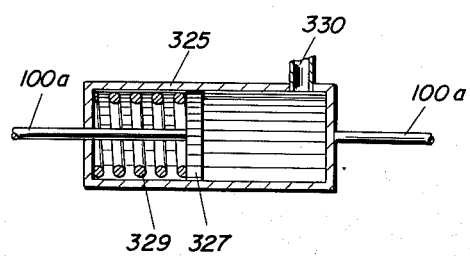
FIG. 22
INVENTOR.
Claude Hector May
BY Adams, Stevens and Mase
AGENTS.

United States Patent Office 2,754,691
Patented July 17, 1956

2,754,691

VARIABLE GEAR RATIO POWER TRANSMISSION APPARATUS

Claude Hector May, Columbus, Ohio, assignor to The Murray Corporation of America, a corporation of Delaware Application March 17, 1951, Serial No. 216,183

Claims priority, application Union of South Africa March 21, 1950

14 Claims. (Cl. 74—472)

This invention relates to power transmission, and, more particularly, to the control of power transmission, as well as means for effecting transmission of power including flexible coupling means for power transmission. This invention also relates more particularly to the synchronization of a plurality of power sources.

For purposes of simplification, this invention will be described in relation to motor vehicles, but it is to be understood that the invention has much wider application. For example, the means for controlling power transmissions to be described hereinafter has application to any situation wherein power transmission with varying speeds is to be obtained. Furthermore, the means for transmitting power, contemplated as part of this invention, has wide application to any form of power transmission means. Moreover, the means for flexibly transmitting power and for synchronizing a plurality of power sources also has application to any form of power transmission system.

Considering this invention as applied to motor vehicles, it will be noted that the two main considerations, which have to be balanced by designers of motor vehicle transmission systems, are on the one hand economy of operation, and on the other hand power reserve for acceleration.

Satisfactory reserve power necessary for reasonably rapid acceleration and hill climbing are obtained in conventional motor vehicles by gearing the engine to the road wheels at such a ratio that the maximum speed of the vehicle is reached at engine revolutions substantially above that which corresponds to the engine's speed at maximum power.

For example, a typical, hypothetical automobile may be geared to the have the engine run at approximately 1,000 revolutions per minute, at 20 miles per hour. The maximum speed of this automobile might be 85 miles per hour at 4,250 R. P. M. and at approximately 70 delivered horsepower from the engine. However, the maximum power of the engine may easily be 85 horsepower at a lower engine speed, for instance, at approximately 3,400 R. P. M. Therefore, it will be seen that the available horsepower for this particular engine will increase with the speed of the automobile to a speed of approximately 70 miles per hour, and then decrease to a lower value at the maximum speed of the automobile. This is, of course, the power available. The power required in order to achieve these speeds for this particular automobile will be considerably less, except at the maximum speed of the automobile. For instance, when this automobile is running at 60 miles per hour only 30 horsepower is required to maintain that speed. However, there is some 83 horsepower available. This means that the excess available horsepower for acceleration is the difference between 83 horsepower and 30 horsepower, or 53 horsepower. Thus, it can be seen how a reserve power supply for acceleration is provided in such a typical automobile.

Naturally, this reserve of power available is only obtained at the sacrifice of the other factor under consideration, namely, economy of operation. For instance, at this same speed of 60 miles per hour, which utilizes only 30 horsepower, the engine is well throttled down, the effective compression ratio is lowered, and the engine speed is high (about 3,000 R. P. M. in our example), and, therefore, friction losses are also high. This same engine could produce 30 horsepower at 1,000 R. P. M. It would therefore be possible to gear the automobile at a ratio to produce that much power at that lower speed, but only at a sacrifice of reserve power for acceleration. The advantage of such a gear ratio producing 30 horsepower at a lower engine speed would be an increase of mechanical efficiency of from 48 per cent to approximately 85 per cent. The specific fuel consumption would only be approximately 60 per cent of that which would otherwise be required, thereby giving an improved mileage of approximately 67 per cent at 60 miles per hour.

At a slower speed, for instance 30 miles per hour, the advantage of such a different gear ratio is even more noticeable. The mechanical efficiency is increased from 37 per cent to 82 per cent and the mileage improves approximately 100 per cent.

In the past attempts have been made to reconcile the conflicting demands of economy and reserve power for acceleration. Fluid couplings and the so-called torque converters have not solved this problem but have merely provided an easier system for driver control. High ratio overdrive, however, with an automatic change down in gear ratio to provide for quick acceleration, have succeeded in reducing fuel consumption by as much as 20%. As noted above, even greater improvements can be achieved.

It is therefore one object of this invention to provide a completely automatic transmission and control whereby optimum efficiency and fuel consumption is achieved, while maintaining maximum power of the engine available at all speeds for acceleration demands.

It is another object of this invention to provide a power transmission control arrangement whereby at all speeds except the very lowest, optimum fuel consumption is obtained. It is still another object of this invention to achieve these desirable results with no demand whatsoever on the skill of the individual driver.

It is still another object of this invention to provide such a power transmission control arrangement whereby the engine will be running at the speed which will result in maximum efficiency at the power required for any given road speed, and will never exceed the engine speed required for maximum power.

It is still another object of this invention to achieve these ends with vast reductions in engine wear.

It is a further object of this invention to provide a means for transmitting power in such an arrangement so that a maximum range of gear ratios may be obtained.

It is yet a further object of this invention to provide an apparatus for flexibly transmitting power in such an arrangement.

It is a still further object of this invention to provide a means for insuring alignment of power transmission belts, and equalization of load thereon, in a multibelt power transmission apparatus.

It is still a further object of this invention to provide a flexible means of power transmission which will also function to synchronize a plurality of power sources.

Various additional objects and advantageous features of this invention will become apparent from the following description when read in conjunction with the accompanying drawings, wherein:

Fig. 4 is a side-elevation sectional view of a detail of the power transmitting portion of the device shown schematically in Fig. 1;

Fig. 5 is a side-elevation view, partially in section, of a detail of the driven portion of the power transmitting mechanism disclosed schematically in Fig. 1;

Fig. 6 is a section of Fig. 5 in the plane 6—6;

Fig. 7 is a side-elevation view, partially in section, of one-half of a modification of the power transmitting device shown in Fig. 4;

Fig. 8 is a section of Fig. 7 in the plane 8—8;

Fig. 9 is a side-elevation view, partially in section, of a modification of the device shown in Fig. 5;

Fig. 10 is a section of Fig. 9 in the plane 10—10;

Fig. 18 is a side elevation sectional view of the flexible power coupling and synchronizing device comprising a portion of this invention;

Fig. 19 is a plan view of a portion of the device shown in Fig. 18;

Fig. 20 is a section of Fig. 19 in the plane 20—20;

Fig. 21 is a section of Fig. 19 in the plane 21—21; and

Fig. 22 is a side-elevation view, partly in section, of a modification of the throttle control linkage.

Figure 1:
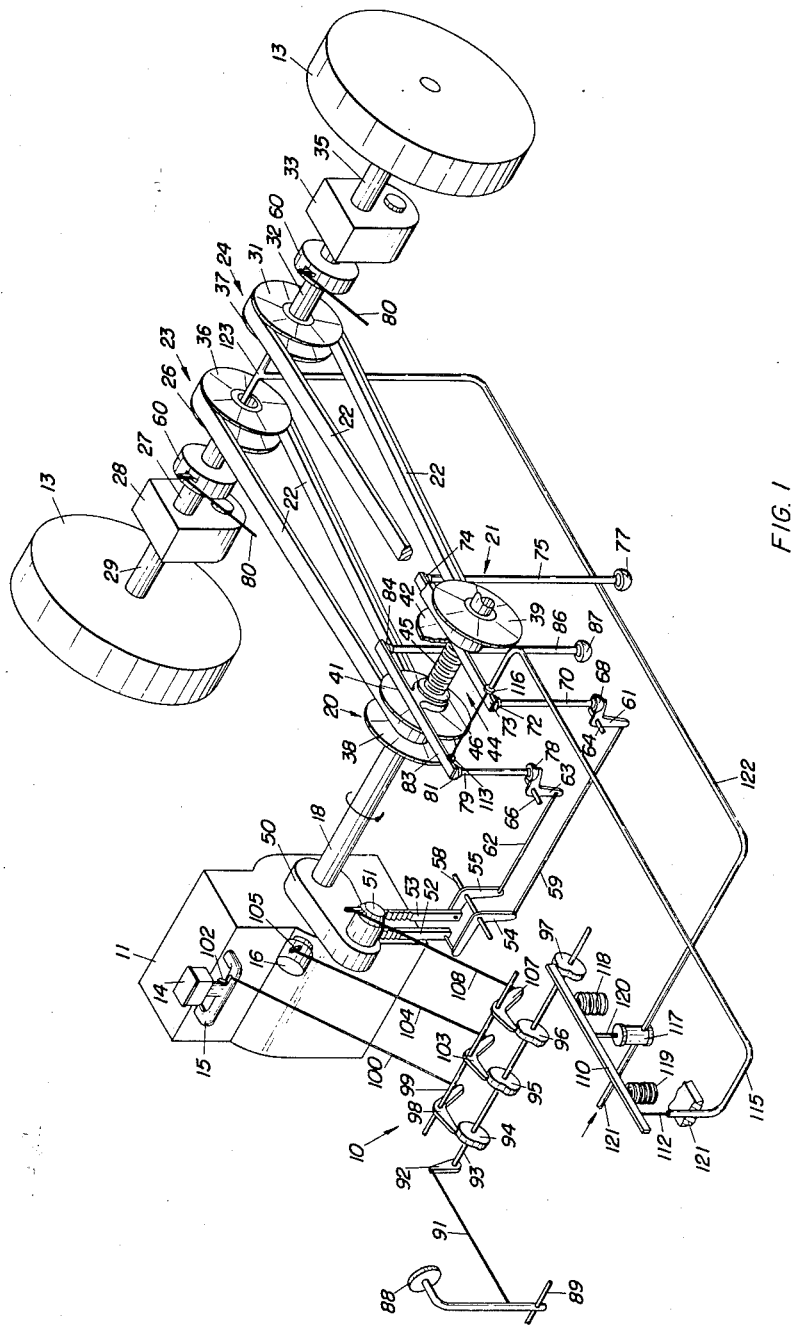
Fig. 1 is a perspective view, partially schematic, illustrating the application of the power transmission control device to a motor vehicle.

Referring to the drawings, and, more particularly, to Fig. 1, the control apparatus is indicated generally at 10. This control apparatus is shown as applied to an ordinary motor vehicle provided with an internal combustion engine illustrated diagrammatically at 11, and rear driving wheels 13—13. The engine 11 is provided with a carburetor 14, and accompanying manifold 15. The engine 11 is also provided with an ignition distributor 16, and a drive shaft 18 which is connected through a pair of driving pulleys indicated generally at 20 and 21. Driving pulleys 20 and 21 are connected by means of V-belts 22—22 to driven pulleys indicated generally at 23 and 24. Driven pulley 23 is provided with a flange 36 which is fixedly secured to shaft 27. Shaft 27 is connected by means of one of clutches 60—60 to reduction gearing in reduction and reversing gear box 28, which gearing is connected by means of shaft 29 to wheel 13. In like manner, driven pulley 24 is provided with a flange 37 fixedly attached to shaft 32 which is connected by means of one of clutches 60—60 to reduction gearing in reduction and reversing gear box 33. This reduction gearing is connected by means of shaft 35 to the other wheel 13. Pulley 23 is provided with an outer flange 26 which is axially slidable with respect to shaft 27, but rotatably fixed thereto. In like manner, pulley 24 is provided with flange 31 which is axially slidable on shaft 32 but rotatably fixed thereto. Since the sliding flanges of the driver and driven pulleys are oppositely disposed, belts 22—22 are maintained in constant alignment.

Driver pulley 20 is provided with a flange 38 fixedly secured to driving shaft 18, and driver pulley 21 is provided with a flange 39 also fixedly secured to shaft 18. Driver pulley 20 is also provided with a flange 41 axially slidable with respect to shaft 18 but rotatably fixed thereto. Driver pulley 21 is likewise provided with flange 42 axially slidable with respect to shaft 18 but rotatably fixed thereto. Freely positioned on shaft 18 between flanges 41 and 42 is a screw jack indicated generally at 44, comprising a threaded screw 45, equipped with an enlarged end 46, and a nut 47 threadedly engaging said screw, and also provided with an enlarged end 48 (see Fig. 4).

Drive shaft 18, through gears contained in gear housing 50, is connected to governor 51. Governor 51 actuates racks 52 and 53. Rack 52 is connected to one end of bell crank 54, while rack 53 is connected to one end of bell crank 55. Bell cranks 54 and 55 are pivotally secured to shaft 58 which is fixedly secured to the vehicle frame. Bell crank 54 is connected by means of rod 59 to bell crank 61. Bell crank 55 is connected by means of rod 62 to bell crank 63. Bell crank 61 is pivotally secured to shaft 64, and bell crank 63 is pivotally secured to shaft 66, both of which shafts 64 and 66 are attached to the vehicle frame. The opposite end of bell crank 61 is connected by means of ball joint 68 to rod 70 which in turn, through ball joint 72, is connected to brake arm 73. Brake arm 73 is supported by means of ball joint 74 on rod 75 which rod is supported by means of ball joint 77 on the vehicle frame. The opposite end of bell crank 63 is connected by means of ball joint 78 to rod 79 which is connected by means of ball joint 81 to brake arm 83. Brake arm 83 is connected, by means of ball joint 84, to rod 86 which is connected to the vehicle frame by means of ball joint 87. The vehicle operator's pedal 88 is pivotally mounted on shaft 89 which is connected to the vehicle frame. Connected to pedal 88 is rod 91 which by means of lever arm 92 rotates shaft 93.

Fixedly secured to shaft 93 are cams 94, 95, 96 and 97. Cam 94 is engaged by one end of bell crank 98 pivotally mounted on shaft 99. The other end of bell crank 98 is connected to rod 100 which in turn is connected to lever 102 which controls the throttle valve in the carburetor.

Cam 95 is engaged by one end of bell crank 103 also pivotally mounted on shaft 99. The other end of bell crank 103 is connected by rod 104 to control crank 105 which advances or retards the ignition spark.

Cam 96 is engaged by one end of bell crank 107, also pivotally mounted on shaft 99. The other end of bell crank 107 is connected by means of rod 108 to the crank control 109 which adjusts the speed setting of the governor 51. Cam 97 engages one end of lever 110, the other end of which is connected to the inner flexible member 112 of a flexible control. The other end of member 112 is connected to an attachment 113 on brake arm 83. The conduit 115 covering member 112 and through which member 112 may slide is attached at the lever end to the frame of the vehicle, and at the opposite end to an attachment 116 to the brake arm 73.

The center of lever 110 is connected to the control linkage 120 of an adjustable pressure reduction valve 117. One side of lever 110 is normally urged downwardly by tension spring 118 while the other side of lever 110 is normally urged upwardly by compression spring 119. Pressure reduction valve 117 is connected to pipe 121 which is connected to a source of fluid supply. The fluid is preferably air, but may be another gas, water, oil, etc. The outlet side of pressure reduction valve 117 is connected by means of piping 122 to the driven pulleys 23 and 24 by means of piping 123.

Brake arm 83 normally engages the raised portion 46 of jack screw 45, while brake arm 73 normally engages the raised portion 48 of nut 47. (See Figs. 3 and 4.)

Clutches 60—60 are provided between shafts 27 and 32 and reduction and reversing gear boxes 28 and 33. These clutches may be engaged and disengaged by means of control rods 80—80 which can either be connected to pedal 88 in a manner similar to that in which control rod 91 is connected to pedal 88, or to a separate pedal in a manner obvious to one skilled in the art.

Figure 2:
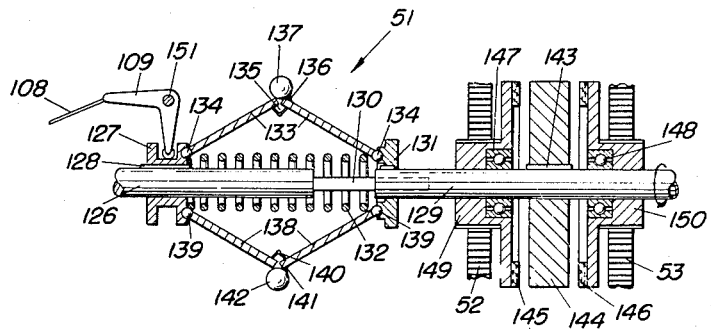
Fig. 2 is a side-elevation view, partially in section, showing a detail of a part of the device shown in Fig. 1.
Figure 3:
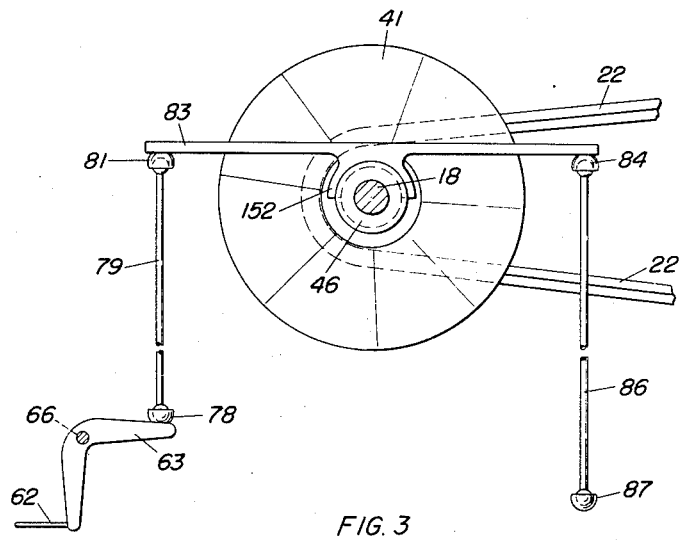
Fig. 3 is a side-elevation view, partially in section showing a detail of the driving portion control of the device shown in Fig. 1.

An understanding of the operation of the power transmission control device constituting a part of this invention will be better understood upon reading a description of some of the components shown schematically in Fig. 1, and in detail in Figs. 2, 3 and 4.

Referring more particularly to Fig. 2, there is shown a detailed sectional view of the governor 51. Governor 51 is of the usual type mounted on shaft 126, collar 127 being rotatably fixed to shaft 126 by means of spline 128, but free to slide axially thereof. Such axial movement of collar 127 may be effected by bell crank 109 which is connected to rod 108 pivotally mounted on shaft 151. Shaft 126 is slidable axially of shaft 129, but the two are rotatably fixed by means of the square extension 130 of shaft 126, which extension cooperates with a corresponding hole in shaft 128. Fixedly secured to shaft 129 is collar 131 which is normally urged away from collar 127 by means of spring 132. Connecting collars 127 and 131 are arms 133—133 mounted in collars 127 and 131 respectively by hinge joints 134—134 and connected together by hinge 135. Affixed to one of members 133—133, as by welded joint 136, is weight 137. Similarly connecting collars 127 and 131 are oppositely disposed members 138—138 respectively connected to collars 127 and 131 by hinge joints 139—139 and connected to each other by hinge 140. Secured to one of members 138—138, as by means of welded joint 141, is weight 142.

Fixedly secured to shaft 129 by means of key 143 is clutch disc 144 adapted to engage either clutch face 145 or clutch face 146, both of which are rotatably mounted on shaft 128, as by means of ball bearings 147 and 148. Clutch face 145 is provided with a pinion 149 adapted to engage rack 52 and clutch face 146 is provided with a pinion 150 adapted to engage rack 53. It will be seen that the speed setting of governor 51 may be adjusted through rod 108 and movement of bell crank 109, which slides collar 127 axially of shaft 126. Moreover, it will also be seen that outward rotational movement of weights 137 and 142 will cause axial movement of clutch disc 144 which upon engagement with clutch face 145 will effect movement of rack 52 and engagement of clutch face 146 will effect movement of rack 53.

Fig. 3 illustrates in detail the connection of a brake arm such as brake arm 83 with raised screw portion 46. As shown, brake arm 83 is provided with a circular-shaped brake-groove engaging portion 152. Normally, brake arm 83 is raised so that member 152 is out of contact with portion 46, but it will be seen that movement of rod 79 in a downward direction through the action of bell crank 63 will cause portion 152 frictionally to engage screw member 46.

Referring now more particularly to Fig. 4, it will be seen that shaft 18 has fixedly secured thereto, as by means of welded or brazed joint 153, a flange 39 of pulley 21. Also fixedly secured to shaft 18 as by means of welded or brazed joint 155, is flange 38 of pulley 20. Flange 41 of pulley 20 is rotationally fixed to shaft 18 by means of spline 156, but is free to slide axially thereon. The same is true of flange 42, which is rotatably fixed to shaft 18 by spline 157. Positioned between the flanges of these respective pulleys are belts 22—22. Jack sleeve shaft 44 is composed of screw 45, freely mounted on shaft 18, and provided at one end with a raised portion 46 provided with a circumferentially extending groove 154 adapted to engage its respective brake-groove engaging portion 152. The other end of screw 45 threadedly engages nut 47 provided with a raised or enlarged portion 48 also having a circumferentially extending groove 159 thereon adapted to engage the complementary member of brake arm 73. Positioned between the end of screw 45 and slidable flange 41 of pulley 20 is a thrust bearing 157, made of a material such as carbon having a relatively higher coefficient of friction than the screw thread 45—47. Similarly positioned between nut 47 and slidable flange 42 of pulley 21 is thrust bearing 158.

It will be seen that while shaft 18 is rotating, braking action by brake arms 83 or 73 will cause relative axial movement between screw 45 and nut 47, depending upon the direction of rotation of shaft 18 and whether the thread on screw 45 and nut 47 is a right-hand thread or a left-hand thread. Except when rounding corners, there is at all times equal tension in belts 22—22. Therefore, relative movement between screw 45 and nut 47 will cause belts 22—22 to travel inwardly or outwardly with respect to shaft 18 up and down their respective flanges of pulleys 20 and 21. Thrust bearings 157 and 158 insure a threading action between screw 45 and nut 47 since the frictional force between the surface of the bearing in each case and their respective screw or nut members is greater than the frictional force between the screw and the nut itself. For instance brake application on screw member 46 will break down the frictional power of thrust member 157 and slow down or stop screw 45, thus causing screw 45 to move relative to nut 47 which is still being driven at the speed of shaft 18 by virtue of the frictional power of thrust bearing 158.

Referring now more particularly to Figs. 5 and 6, there is shown a sectional view of one of the driven pulleys 23 and 24. Pulley 23 is provided with fixed flange 36 and movable flange 26. Shaft 27 in the zone of the pulley is hollow. Flange 36 of the pulley is fixedly secured to the shaft by means of welded or brazed joint 160. Fluid conducting pipe 123 is coaxial with shaft 27 and remains fixed while shaft 27 rotates. Pipe 123 enters shaft 27 through bearing 161, and extends almost the entire length of the shaft, passing through piston 162, which is slidably positioned within said shaft. A seal is effected between piston 162 and pipe 123 by means of O ring 164 and a seal is maintained between piston 162 and the inner surface of hollow shaft 27 by means of O ring 165. Piston 162 is fixedly connected to movable flange 26 by means of pins 167—167 which are adapted to slide axially of shaft 27 in slots 168. Flange 26 may be additionally prevented from relative rotation with respect to shaft 27 by means of a brazed joint or resistance welded joint 169 which secures flange 26 to spline 170 which slides in slot 171. It will be seen that fluid pressure through pipe 123 exerted upon the head end of piston 162 will cause movable flange 26 to be slid toward flange 36, the tension in belt 22 normally tending to push the flanges apart.

The operation of the device for controlling power transmission, constituting a part of this invention may now be described as follows:

Let us assume that the motor vehicle is stationary, the engine has been started and is running, and that the operator of the motor vehicle wishes to proceed on his way in a normal and reasonable manner. Shaft 18 is therefore rotating in the direction indicated, and rear wheels 13—13 are stationary since clutches 60—60 are not engaged. The driver slowly engages the clutches 60—60 and as the clutches 60—60 are engaged presses the control pedal 88 to a position which will eventually give him the speed at which he desires to drive. Movement of control pedal 88 sets the governor 51 so that it will limit the engine speed. This is accomplished by rotation of shaft 93, movement of cam 96, and accompanying movement through bell crank 107 and rod 108, bell crank 109 and collar 127. (See Fig. 2.) Movement of the control pedal will also cause movement of cams 94 and 95. These cams are cut in conjunction with cam 96 so that the most efficient setting of throttle and ignition will be obtained at every engine speed. In other words, since the degree of movement of cams 96 will determine the eventual engine speed, it is obvious that cams 94 and 95 can be cut so as to provide the greatest fuel economy and best ignition setting for an accompanying engine speed. Cam 97 will also be rotated by rotation of shaft 93 and will cause link 116 of pressure control valve 117 to be moved upwardly since cam 97 will cause arm 110 to be moved upwardly. Such upward movement will permit fluid, preferably air, to flow through pipe 122 and into hollow shaft 27, thereby forcing flange 26 of pulley 23 toward flange 36, and such air will likewise flow into a similar portion of hollow shaft 32 thereby forcing the flange 31 of pulley 24 toward flange 37.

In order for a V-belt to function properly, it is essential that the tension on the slack side of the belt be at approximately 20% of the total tension in the drive side. Cam 97 and its associated valve 117 and air supply line 122 merely make provision for maintenance for such slack side tension. In other words, depending upon the engine speed and gear ratio, it is desirable to maintain a slack side tension of approximately 20% that of the drive side tension by forcing the flanges of the driven pulleys together. This is initially controlled and set depending upon engine speed by cam 97. As the gear ratio varies the pressure on the sliding flanges 26 and 31 of pulleys 23 and 24 is likewise varied in a manner to be described hereinafter.

As the motor vehicle starts away from the curb, the gear ratio will of course be at its lowest. Flanges of pulleys 23 and 24 will be as close together as possible and flanges of driver pulleys 20 and 21 will be as far apart as possible. Consequently, the engine speed will at first drop and will not be as high as that set by means of foot pedal 88. Therefore, the governor weights 147 and 142 will tend to approach each other, thereby causing shaft 128 in Fig. 2 to move in a right-hand direction. Since that shaft is rotating in the direction indicated, if it moves sufficiently to have clutch disc 144 engage clutch face 146, pinion 150 will be caused to rotate in the same direction as shaft 128 thereby causing rack 53 to move in an upward direction. Movement of rack 53 in an upward direction (see Fig. 1) through its accompanying linkage causes brake arm 83 to engage screw member 46. Referring particularly to Fig. 4, braking of screw member 46 will cause flanges 41 and 42 to approach each other, since the thread of jack screw 44 is a left-hand thread. However, since these flanges are as close as possible, since the gear ratio is still as low as possible, there will be no further movement of the flanges 41 and 42. The engine speed will, of course, however, soon rise until the governor is on speed and member 144 is out of contact with either of the clutch discs 145 or 146 (see Fig. 2). This will then be the situation existing which will represent the highest road speed available at the engine speed set by foot pedal 88 in the lowest gear ratio. However, if the road is more or less level the engine, at the set speed may have much more power than is needed to maintain the car at the road speed reached, due to the extremely low gear ratio, so that the engine will tend to run faster. Faster running of the engine will cause governor weights 137 and 142 to be moved apart thereby causing shaft 128 to moce in a left-hand direction until it engages clutch face 145. Engagement of clutch face 145 will cause it and pinion 149 to rotate in the same direction as shaft 128 thereby causing rack 52 to move in an upward direction. Movement of rack 52 in an upward direction by means of its linkages including bell crank 54, rod 59, bell crank 61 and rod 70, will cause brake arm 73 to move in a downward direction, thereby engaging nut 47 and preventing it from rotating at the same speed as is drive shaft 18. Since the jack screw is provided with a left-hand thread, the net result will be to cause movable flanges 41 and 42 to move apart, thereby forcing belts 22—22 toward the outer periphery of pulleys 20 and 21, with an accompanying inward radial movement of belts 22—22 in driven pulleys 23 and 24. Movement of nut 47 away from its corresponding screw member 46 also causes brake arms 83 and 73 to move away from each other. The net result of this is to cause flexible cable 112 to move downwardly thereby causing link 110 to move downwardly, thus reducing the air pressure in pipe 122 and, consequently, reducing the force exerted on the sliding flanges 26 and 31 of driven pulleys 23 and 24, thereby maintaining the same proportionate slack side belt tension in belts 22—22. The gear ratio will accordingly rise as will the road speed until such time as the power output of the engine just balances the power required to maintain the road speed. This then is the maximum speed possible at the particular speed set by control pedal 88. If a hill is encountered, the engine speed will tend to drop causing the governor weights 137 and 142 to approach each other thereby moving flanges 41 and 42 of the driver pulleys toward each other and lowering the gear ratio sufficiently to maintain the set engine speed. The movable flanges of the driven pulleys will be acted upon by air pressure in pipe 122 accordingly to maintain the slack side belt tension ratio. There will naturally be a reduction of road speed. Should the driver wish to maintain his road speed, it would only be necessary to move pedal 88 forward further and a higher engine speed and greater power, coupled with a lowering in gear ratio, will keep his desired road speed. On a down gradient the above actions will be reversed.

If the driver of the motor vehicle is driving on a level road and wishes to increase his road speed, it is only necessary for him to move control pedal 88 forward.

From the above, it will be seen that the engine will be running constantly at a speed, throttle, and ignition setting which is the most economical for any desired road speed. Cams 94, 95, 96 and 97 may always be shaped to avoid any periodic vibrations which may occur in the engine as is well within the skill of an ordinary person skilled in this art.

While this control mechanism has been described in conjunction with a V-belt pulley power transmission system for a motor vehicle, it should be apparent that many other forms of power transmission systems, such as friction discs, etc., may be utilized with accompanying changes of detail well within the skill of an ordinary mechanic to accomplish the same end achieved by the apparatus disclosed herein.

The control apparatus constituting a portion of this invention is adaptable to use with electrical and hydraulic power transmission systems as well as power transmission systems relying upon frictional contact of various elements for the transmission of power. It should be apparent that when this control apparatus is applied to power transmission systems other than those relying upon such frictional contact, that the portion of the control apparatus used to maintain a fixed minimum ratio of frictional pressure may be omitted.

It will be apparent that this control mechanism achieves maximum economy of operation at all engine speeds and that acceleration demands are also well provided for. Merely by moving control pedal 88 forward, an immediate increase in speed can be achieved. It will also be apparent that the maximum vehicle speed will be reached at the maximum power speed of the engine. Thus, undue wear from the normal excess engine speed is eliminated.

An incidental advantage of the particular form of power transmission disclosed is that the differential speed requirements of the two rear driving wheels, when on a turn, are fully met without the aid of the more normal differential gear. Further, contrary to the results obtained by a normal differential gear, the torque transmitted by any one driving wheel is not limited to that transmitted by the other. Consequently, should one wheel become bogged down in mud or snow, the other wheel will not remain stationary but will provide traction.

Normally, both driving wheels will run at the same speed and carry the same torque. However, on turning a corner one wheel will run faster than the other. The action of tending to run faster reduces the torque of this wheel, reduces the power pull in the load side of the V-belt, and also reduces the sliding pulley flange thrust of the driver pulley. At the same time, the opposite is taking place through the inside driving wheel which tends to slow down. The net result of these effects is that the two sliding flanges on the primary shaft become unbalanced, one with the other, in the manner of axial thrust. The flange against the belt to the slower wheel is exerting greater axial thrust than the other. Thus the two sliding flanges are spaced by the screw jack which is free to float on the shaft, the whole assembly of jack and flanges is urged axially until, once again, the forces are in equilibrium. At this stage, the gear ratios to the two driving wheels are different in the exact proportions of the rotative speeds of the wheel, and a perfect differential effect is achieved.

Provision for maintaining slack side belt tension proportionate to the drive side tension results in a higher mechanical efficiency throughout all powers transmitted, except the very maximum, a considerable reduction in wear of the belt, and a reduction in average bearing loads. If friction wheels were substituted for the V-belt and pulley arrangement disclosed herein, it would be obvious that the substitute for slack side belt tension would be a variation in the pressure between such friction wheels.

Preferably, in the particular power transmission device to which the power transmission control device has been described, it would be advantageous to arrange that the primary and secondary pulleys are substantially of the same diameter. That way, the greatest range of gear ratio would be obtainable. It would mean, however, that in the highest gear ratio the secondary shaft would rotate at higher speeds than that of the primary shaft. This would not be advantageous and to overcome such a disadvantage a final reduction gear to the wheels might be placed between the driven pulleys and the rear wheels.

As shown in the preferred embodiment, clutch 60 is placed between the pulleys and the reduction and reversing gear instead of in the more usual place between the engine and the gear. This will, of course, necessitate a clutch and gear of greater capacity, but will result in the following advantages. The belt pulley system can act as useful fly wheel weight and save some of that normally in the fly wheel. The gear ratio can still be changed when there is no connection to the driving wheel. With two-stroke engines as power units a predetermined amount of belt tension drag may be left in the gear in the low or no-load state. The drag would insure regular two stroking at all times and completely eliminate the usual and objectionable 4, 6 or 8 stroking common in the light running two-stroke engine.

It will be appreciated that, with this invention, it is possible to have a completely independent drive to each driving wheel, and this is the preferred arrangement which will be described hereinafter.

As shown in Figs. 1, 4, 5 and 6, the power transmission control device has been described in conjunction with two belts. If it is preferred that a greater number of belts be used, for that purpose, a driving and driven set of pulleys have been disclosed.

In the past, when two or more belts have been used to drive one device from one source, it has been customary to use very close tolerances on the pulley groove dimensions and to use matched belts.

Even with such extreme care, however, the mechanical efficiency of a multibelt drive is invariably lower than that of a single belt drive.

This invention discloses an apparatus whereby more than one belt may be used to drive each wheel and yet due to the arrangement of the sliding flanges there is a complete balance of loads as between belts.

Figure 14:
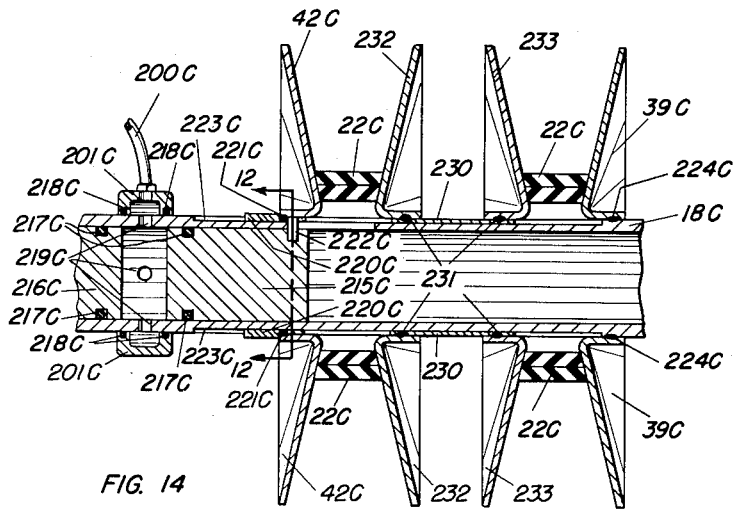
Fig. 14 is a modification of the device shown in Fig. 7, and intended to be used in conjunction with the devices shown in Figs. 9 and 11.

Driver pulleys in Fig. 7 or 14 may be used with driven pulleys in Fig. 9, and such a drive will give a complete balance of load in the two belts 22a—22a. Further, correct belt alignment, from driving to driven pulleys, is always maintained.

It will be obvious to any person skilled in the art that the same method of load balancing, as described in the above-shown two-belt arrangement, may be employed with three or more belts.

Introduction on the driving pulley group of further paired flanges (189, 190) between the fixed flange 39a and the thrust-operated flange 42a in Fig. 7 will make up a driving group with as many pulleys as are required.

A similar arrangement could be employed for the driven pulley group in Fig. 9. In a two-belt arrangement, and reading from the left, No. 1 flange is coupled to No. 4 flange, No. 2 flange is the one receiving thrust from the piston within the shaft, and No. 3 flange is the fixed flange.

In a three-belt arrangement mated with a three-pulley driver as imagined from a modification of Fig. 7 or 14, the same numbering holds good. The second from left is always the thrust flange and the second from the right is always the fixed. No. 1 would always be coupled to No. 4 and No. 3 to 6, etc.

In a four-belt arrangement the same coupling as above would be used, i. e., second from left taking the thrust, second from right fixed, No. 1 coupled to No. 4, No. 3 coupled to No. 6, and No. 5 coupled to No. 8.

In a five-belt arrangement, the structure would be the same as for a four-belt arrangement but flange 7 coupled to flange 10 would be added. This arrangement could be extended to any number of belts.

It will also be appreciated by a person skilled in the art that this arrangement of flanges and their coupling could be used in fixed ratio belt drives in order to attain the benefit of the higher mechanical efficiency and the freedom from the restrictions and cost of matched pulley flanges and matched belts. In such cases the flange hitherto indicated as a thrust flange would be another fixed flange. All other flanges would be coupled and free to float as mentioned above.

While this invention is described in conjunction with four belts, it is apparent that it is applicable to any number of belts.

Referring more particularly to Figs. 7 and 8, shaft 18a corresponds to driving shaft 18 shown in Figs. 1 and 4. There is shown in Fig. 7 a portion of a jack screw 45a and a nut 47a provided with a raised end 48a corresponding to the jack shaft shown in detail in Fig. 4. There is also provided a thrust bearing 158a. Flange 39a is fixedly secured to shaft 18a by means of a resistance-welded joint 180. Instead of a resistance-welded joint 180, a brazed joint may be used or any other satisfactory means for attaching flange 39a to shaft 18a. The sliding flange 42a, abutting thrust bearing 158a, is attached by means of resistance-welded joints 181—181, or brazing, to a plurality of splines 183—183, which slide in slots 184—184 on shaft 18a. As shown in Fig. 8, there are six of these slots and splines. Slots 184—184 extend to flange 39a. Also slidably positioned in these slots are splines 186—186. As shown in Fig. 8, there are six such splines. Secured to opposite ends of these splines by resistance-welded joints 187—187 are opposed pulley flanges 189 and 190. One of belts 22a—22a is positioned between flange 42a and flange 189 and one of belts 22a—22a is positioned between flange 39a and flange 190.

In operation, movement of the nut 47a toward the right will cause movement of flange 42a in the same direction. This will cause belt 22a, positioned between flanges 42a and 189, to move toward the outer periphery of the flanges. However, since the same belt tension will exist in either of belts 22a—22a and since flanges 189 and 190 are connected together by means of splines 186—186, this will also cause movement of flanges 189 and 190 toward the right with consequent movement of the other of belts 22a—22a, positioned between flange 190 and 39a, toward the outer periphery of that pulley. The movement of flanges 189 and 190 will cease upon positioning of belts 22a—22a such that they are subjected to the same tension. Movement of nut 47a in an opposite or left-hand direction causes a corresponding movement of flanges 42a, 189 and 190 in a left-hand direction.

The net result of the flange arrangement, above described, is to enable both belts 22a—22a always to run at the same tension. While running at the same tension they must both transmit equal amounts of power and therefore must both be at the same gear ratio. It would not, in fact, matter if the two belts were not quite equal in length or width, they would still run at the same ratio and transmit the power equally. It will be seen that should one belt not be transmitting one-half of the power, but some lesser amount, then its tension would be less than that of the other belt. This lower tension would immediately result in a lower thrust on the corresponding sliding flange pair 189—190. However, since the flange pair 189—190 is free to slide axially, it would be impossible to maintain this unbalanced equilibrium. Therefore, unless the two belts were exactly matched they would not, of necessity ride at the same radius in their respective pulleys. This system eliminates the loss of efficiency resulting from the differential action of pairs of belts in conventional arrangements.

It will be understood, of course, that there is a set of double pulleys corresponding to these pulleys on the other side of the shaft and constituting a mirror image of Fig. 7, abutting against the first movable flange of those pulleys, but spaced by a thrust bearing is a corresponding portion 46a of jack screw 45a.

When using a set of four driver pulleys, it is of course necessary to have a corresponding set of double-driven pulleys, and in Figs. 9 and 10 there is shown such a device. Driven shaft 27a is similar to driven shaft 27 of Figs. 1 and 5, in that it is provided with air pipe 123a and bearing 161a. Slidably positioned inside hollow shaft 27a is piston 162a, equipped with pins 167a—167a, which engage flange 26a. Piston 162a is provided with sealing O rings 164a and 165a, and an increase in air pressure in pipe 123a similarly causes movement of piston 162a in a left-hand direction. Pin 167a slides in slot 168a. Flange 36a is fixedly secured to shaft 27a by means of a resistance-welded joint or brazed joint 160a. However, there is also provided slots 192—192 in each of which slides one of splines 193—193. Fixedly attached to spline 193 by welded or brazed joints 194—194 is pulley flange 196, and at the other end of spline 193, and fixedly secured thereto by welded or brazed joints 197—197, is flange 198. Positioned between these flanges are belts 22a—22a. The operation of this device is very similar to that of the driven pulley shown in Figs. 5 and 6. An increase in air pressure in line 123a causes piston 162a to move in a left-hand direction. Movement of piston 162a in a left-hand direction through pin 167a causes flange 26a to move in the same direction, and through belt 22a, causes flange 196 also to move in a left-hand direction. Since flange 198 is connected to the same spline to which flange 196 is connected, flange 198 also will tend to move in a left-hand direction. Flange 36a, however, remains fixed. Movement in this direction of these flanges will cause belts 22a—22a to be pushed toward the outer periphery of these two pulleys until an equilibrium is established as in the device shown in Figs. 7 and 8. Of course, a device similar to that shown in Figs. 9 and 10 will also be provided for the other rear wheel.

It will therefore be seen that alignment of the belts is maintained, as well as equalization of loads.

Figure 11:
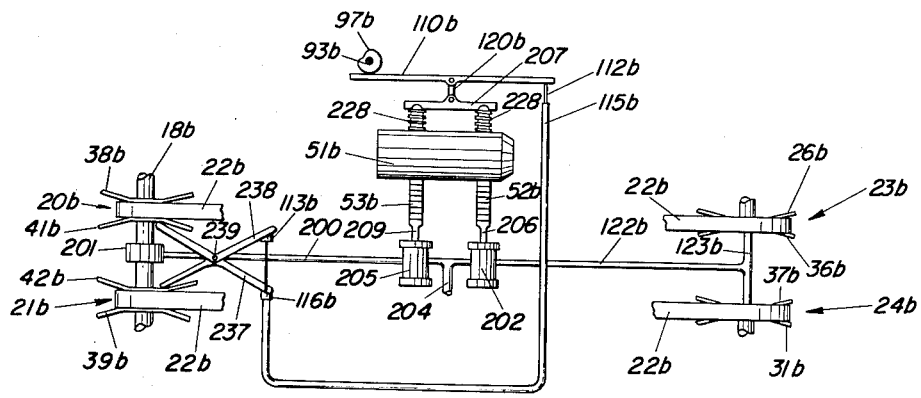
Fig. 11 is a modification of the control mechanism shown in Fig. 1 and intended to be used in conjunction particularly with the devices shown in Figs. 5, 6, 9, 10, 12, 13, 14 and 15.

Instead of the mechanical power transmission control apparatus described, supra, a pneumatic system could as well be employed. Such a device is illustrated schematically in Fig. 11 wherein there are shown two driving pulleys indicated generally at 20b and 21b and comprising outer flanges 38b and 39b fixedly secured to driving shaft 18b which is connected to the power source. Each of pulleys 20b and 21b are provided with an inner sliding flange 41b and 42b. These inner flanges are actuated by means of fluid pressure (preferably air) through pipe 200 and gland 201 in a manner to be described hereinafter in conjunction with the description of Figs. 12 and 13.

Driven pulleys indicated generally as 23b and 24b are also provided, having fixed flanges 36b and 37b and sliding flanges 26b and 31b. Such sliding flanges are moved by the air supplied by pipe 122b and pipe 123b. Pipe 122b is connected through a pressure control valve 202 to air supply pipe 204. Pipe 200 is connected to pressure control valve 205 through the same source of air supply 204. Operating rod 206 of valve 202 is connected to one end of rack 52b, while rack 53b has connected to it the operating rod 209 of valve 205. Racks 52b and 53b extend through governor housing 51b, and the upper end of rack 52b is pivotally connected to one end of arm 207, while the upper end of rack 53b is pivotally connected to the other end of arm 207. The center of arm 207 is pivotally connected to arm 120b, which in turn is connected to rod 110b. One end of rod 110b abuts cam 97b which is actuated by a shaft 93b which may be suitably connected to a shaft 93, as in Fig. 1. The opposite end of rod 110b is connected to the inner flexible member 112b carried in conduit covering 115b. The opposite end of member 112b is connected to arm 238 by attachment 113b, while the corresponding end of covering 115b is connected to arm 237 by attachment 116b. Arms 237 and 238 are pivotally connected by pin 239, and one end of arm 238 abuts flange 41b while one end of arm 237 abuts flange 42b.

Racks 52b and 53b are normally urged upwardly by springs 228—228. The remainder of the control apparatus is as shown in Fig. 1.

The operation of this device is very similar to the operation of the device shown in Fig. 1. Movement of rack 52b in an upward direction causes valve 202 to admit less air pressure to the driven pulley's sliding flanges and by virtue of arm 207 causes rack 53b to move downwardly and valve 205 to admit more air to the driver pulley's sliding flanges, thereby increasing the gear ratio. Movement of rack 53b in an upward direction causes the reverse to occur.

Maintenance of the ratio of slack side belt tension to drive side belt tension is accomplished by means of the movement of arms 237 and 238. As movable flanges 41b and 42b move toward or away from each other, movement of flexible shafting 112b causes accompanying movement of rod 110b. Since rod 120b is connected to the center of rod 110b, the net result is to subtract or add to the air pressure in both the driver and driven ends of the power transmission apparatus, and consequently maintain the optimum ratio. Otherwise, the device functions in exactly the same manner as the device shown in Fig. 1, enabling optimum fuel economy and the most advantageous gear ratio to be achieved for any particular engine speed.

Figure 12:
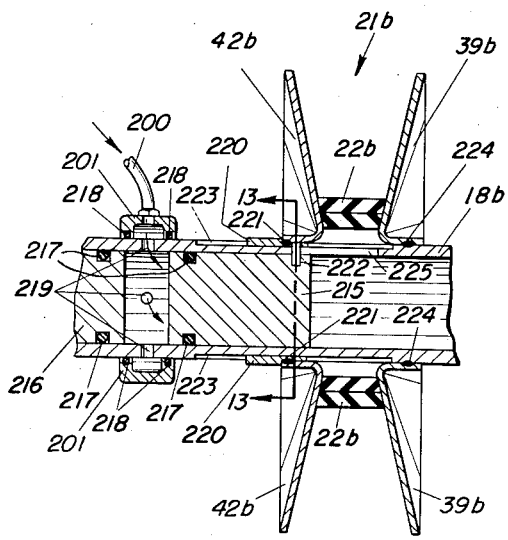
Fig. 12 is a modification of the device shown in Fig. 4, and is intended to be used in conjunction with the devices shown in Figs. 5 and 11.
Figure 13:
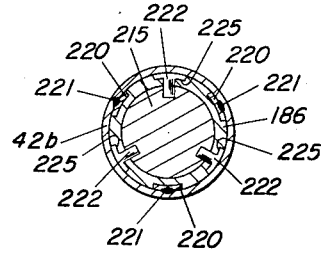
Fig. 13 is a section of Fig. 12 in the plane 13—13.

Driver pulley 21b is shown in detail in Fig. 12. Shaft 18b, which is hollow, is provided with pistons 215 and 216 which are sealed by means of O rings 217—217. Air is admitted through pipe 200 to gland 201 sealed on shaft 18b by means of O rings 218—218. Air is admitted from the gland to the inner part of the shaft by means of a plurality of holes 219—219. Flange 42b is attached to spline 220 by means of welded or brazed joints 221—221 and is attached to piston 215 by means of pins 222—222, which travel in slots 225—225 in shaft 18b. Splines 220—220 ride in slots 223—223. Flange 39b is fixedly secured to shaft 18b by means of welded or brazed joints 224—224. Positioned within these flanges is belt 22b. An increase in air pressure through pipe 200 and into the interior of shaft 18b causes piston and flange 42b connected thereto to move in a right-hand direction, thereby forcing belt 22b to the outer periphery of the pulley flange. It is to be understood, of course, that there is a similar pulley on the other side of the gland 201 which has not been shown in Fig. 12, and which is similarly actuated by piston 216. Fluid pressure admitted through pipe 201 simultaneously urges both belts 22b—22b toward the outer peripheries of pulleys 21b and 20b.

Figure 15:
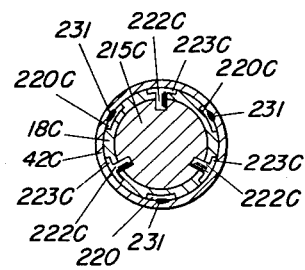
Fig. 15 is a section of Fig. 14 in the plane 15—15.

Figs. 14 and 15 show a double pulley of the type set forth in Fig. 12, wherein flange 39c is fixedly attached to shaft 18c by means of welded or brazed joint 224c. Shaft 18c is hollow and positioned therewithin are pistons 215c and 216c. O rings 217c—217c are provided as seals, and air is brought in through pipe 200c to flange 201c which is sealed to the shaft by means of O rings 218c—218c. Air is introduced from the gland to the interior of the shaft through holes 219c—219c. Connected to piston 215c, by means of pins 222c—222c, is sliding flange 42c connected to splines 220c—220c by means of welded or brazed joints 221c—221c. Spline 220c is adapted to slide in slots 223c—223c. Adapted to slide in the same slots are splines 230—230 at each end of which there is securely fastened by means of welded or brazed joints 231—231 flanges 232 and 233. Positioned between respective flanges 42c and 232 and flanges 233 and 39c are belts 22c—22c.

An increase in air pressure within shaft 18c causes piston 215c to move to the right thereby causing flange 42c to move in the same direction, which motion is transmitted to flanges 232 and 233 through splines 230—230 until belts 22c—22c have been forced toward the periphery of the pulley flanges. Of course, piston 216c is connected to a corresponding set of flanges which have not been shown.

Driving cases will undoubtedly arise where the driver desires to impress his "anticipation" will upon the gear. Such a case would be, for instance, if, when climbing a steep hill, he had occasion to slow down for a bad patch of surface. In this example the gear would already be somewhat lowered for the climb. As the driver eased his pressure on the control pedal, to slow down for the bad patch, the gear ratio would start to rise. After passing the bad patch he would press on the pedal again but it may take a second or so for the gear to lower sufficiently to continue the climb. This may result in too great a loss of speed.

In order to provide for such a driving situation, a modification of the throttle linkage is contemplated. Referring to Fig. 22, there is shown a device which may be interposed in throttle control rod 100 of Fig. 1. This device comprises cylinder 325, rigidly connected to the upper portion of rod 100a. The lower portion of rod 100a is rigidly connected to piston 327 normally urged to the right in Fig. 22 by spring 329. Port 330 is connected to the hydraulic brake system of the vehicle.

The operation of this device is as follows: application of the brake forces piston 327 to the left and effectively lengthens rod 100a, thereby closing the throttle. Thus, the gear ratio is prevented from rising while the throttle is closed, and thereby makes available the lower gear ratio for immediate use.

Figure 16:
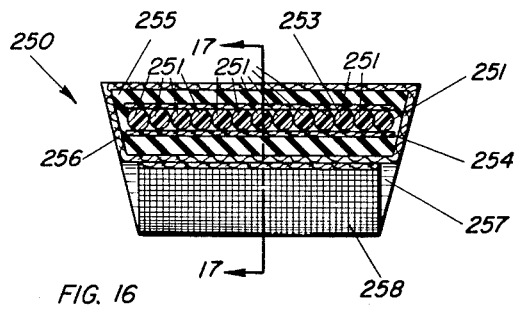
Fig. 16 is a section of a power transmission means in the plane 16—16 of Fig. 17.
Figure 17:
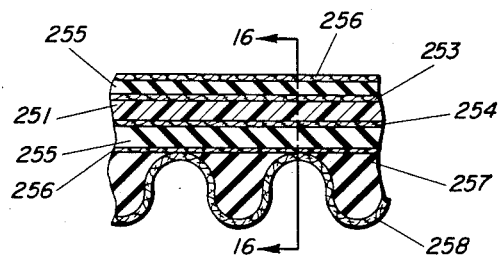
Fig. 17 is a section of Fig. 16 in the plane 17—17.

In order properly to utilize the power transmission control device heretofore described in conjunction with a V-belt and pulley power transmission apparatus, a V-belt, such as shown in Figs. 16 and 17, should be employed.

Such a belt may be used where very high power has to be transmitted by a pulley of a small diameter.

In V-belt design, it is necessary to retain a depth of belt of approximately half the width in order that the section remain stable and that each strand of the tension members take substantially the same load. The maintenance of such a ratio of depth to width, however, limits the minimum bend radius of the belt when used. Bending the belt causes the normal side angle of the trapezoidal section to distort. Consequently, high tension loads are built up on the outside and excessive compression loads on the inside of the belt. These loads cause overheating of the belt and subsequent separation of the various elements.

Referring now to Figs. 16 and 17, the upper portion of the belt, indicated generally at 250, is trapezoidal in cross-section. Positioned within this trapezoidal portion are a plurality of metallic, rayon, nylon, or other textile cords 251—251 wound round the full length of the belt in one continuous piece. Placed above and below these cords, but slightly spaced therefrom by rubber insulation, are two bias-cut strips of fabric 253 and 254. These bias-cut strips are the same width as the layer of cords 251—251. The cord layer is on the neutral axis of the belt. The entire assembly of cords 251—251 and fabric strips 253 and 254 are encased in rubber 255. Preferably the rubber section is formed by separate layers of rubber which are later vulcanized. The entire trapezoidal upper portion of the belt is encased in a bias-cut fabric cover 256. The lower or inner portion of the belt is made up from a strip of corrugated rubber 257 of a depth not less than half that of the belt. This strip of rubber is also of trapezoidal cross-section as shown in Fig. 16 and is capped on the innermost or corrugated surface by a straight-cut strip of fabric 258. It is preferred that the corrugations on the rubber strip have crests and hollows as smooth radius curves. These corrugations may also be perforated for reduction of weight and for cooling purposes. In manufacturing this belt, the inner or lower portion is built up first in the circular belt mold, the outer portion is then built up above it, and the entire assembly vulcanized as one piece.

A belt constructed in accordance with the above description has extremely high beam strength as between pulley flange faces, yet will vary very little in inclined angle during small radius bends. Another advantage of this type of belt, in addition to extremely high and unexpected beam strength, is the fact that during manufacture the bias-cut strips of fabrics 253 and 254 keep the cords 251—251 aligned.

Referring more particularly now to Figs. 18, 19, 20 and 21, there is shown a flexible connection for a plurality of power sources, and also a device for synchronizing two power sources.

In the preferred embodiment of the power transmission control apparatus, as applied to a motor vehicle, there are four driving pulleys, with two internal combustion engines positioned on opposite ends of a driving shaft.

It should be understood, of course, that this invention has application to power sources other than internal combustion engines.

With multiple engine installations in the past, there have been an number of ways of arranging the flexible couplings. Driving shaft axes have been arranged coaxially and through varying angles, up to and including the parallel. Coupling means have been gears, chains, flanges, clutches, etc. In most applications, however, trouble has been experienced with couplings due to backlash, cyclic torque variations, high frequency torsional oscillations, malalignment, etc.

The subject invention discloses a device whereby two or more engines may conveniently be coupled in an arrangement with the driving shafts substantially coaxial. The invention achieves such coupling without backlash or necessity for precision alignment and yet, at the same time, any coupling may be disengaged without necessitating the stopping of the other engine. Further, such a stopped engine or pair or more of engines, may be restarted and will, at the desired time, be recoupled in perfect synchronization entirely automatically.

Referring more particularly to Fig. 18, there is shown the driving shaft 270, which is free to rotate with respect to another driving shaft 271. These shafts are separated by a bearing 272. Fixedly secured to shaft 270 by means of a key 273 is male clutch member 274 which is provided with an annular channel 275 facing away from the shaft. Bonded to the under side of this channel is a flexible diaphragm 276 made of a material such as rubber. Encasing the male clutch member on its clutch surface is a flexible friction surface 277, formed of asbestos-faced material bonded to the diaphragm 276. In the preferred embodiment this sleeve would have a series of transverse cuts up to 90% of the width and cut alternately from either side, to permit radial expansion. Male clutch member 274 is provided with an annular radially extending slot 278 which opens into the chamber 279 formed by member 276. Opening from annular slot 278 on either side of male clutch member 274 are two pairs of opposed slots 280—280, each pair of which is spaced 180° apart. There are a total of four of these slots. Air, or any other suitable fluid, is supplied through these slots by means of pipe 281 through gland 282 equipped with sealing rings 283—283 and O rings 284—284. Female clutch member 285, rigidly attached to, or as shown, forming a part of shaft 271, is provided with a circular portion 286 complementary in shape to friction surface 277 of male clutch member 274 and slightly spaced therefrom. Female clutch member 285 is also provided with a ring 289 pinned thereto by pin 287 and forced against male clutch member 274 by circular spring or O ring 288. Ring 289 is so positioned as to cover holes 280—280. Ring 289 is provided with oppositely disposed grooves 290—290 around its outer periphery, leaving two surface areas 292—292 of approximately 10° radial area spaced 180° apart. These portions 292—292 of ring 289 are the portions which seal or cover holes 280—280.

Instead of air or oil, any other suitable fluid could be supplied through pipe 281. However, because of its availability and cheapness, air is the preferred fluid.

The operation of this device is as follows:

Let us assume that the male clutch member and shaft 270 are rotating and being driven by one prime mover. It is desired to connect another prime mover which is connected to shaft 271 and the female clutch member. A fluid under pressure is constantly supplied through pipe 281 to gland 282. Ring 289 is so positioned on female clutch member 285 that when the portions 292—292 of that ring cover holes 280—280 the particular prime movers will be synchronized. The prime mover attached to shaft 271 is then started and that shaft will rotate in the same direction as shaft 270, but freely thereof because section 277 of the male clutch member will not engage the under side of female ring portion 286. No fluid pressure can build up in chamber 279, since the fluid will leak through holes 280—280, and slots 290—290 of ring 289. This situation will exist as long as the air pressure existing in annular space 278 is permitted to pass into that space through holes 280—280 and out the other holes 280—280 and slots 290—290. However, as shaft 281 rotates, it will bring portions 292—292 of ring 289 into a position whereby holes 280—280 will be covered, thereby preventing any more air from leaking from chamber 278 and consequently rubber channel member 279 will expand thereby forcing friction surface 277 into contact with the under side of ring 286 of female clutch member 285 and thus turning shaft 271 in synchronization with shaft 270.

It is to be understood that the spacing of slots 290 on ring 289 will depend upon the particular types of prime movers under consideration and the manner in which they are to be synchronized. From the foregoing, it will be seen that the member 289 does not take any of the load, but the entire drive load is carried through clutch members 286 and 277. It will also be seen that in operation there is a continuous but elastic connection betwen engine, final drive, and second engine. There is no backlash and the natural hysteresis in the rubber would damp undesirable irregularities and vibrations in the drive.

When a fluid other than air is used in this device, and which fluid is not expendable, it is necessary to provide means for collecting the fluid which passes through holes 280—280 and slots 290—290, for economic reasons, and in the case of oil and like fluids, to prevent fouling of the clutch. Such a collecting device has not been shown, since the construction is a matter of choice and well within the ability of a person skilled in the art.

While this invention has been described in its preferred embodiment, it is to be understood that the words used are words of description rather than limitation and that changes within the purview of the appended claims may be made without departing from the true scope and spirit of the invention.

What is claimed is:

1. In a variable gear ratio power transmission device comprising an internal combustion engine, driver means motivated by said engine, and driven means motivated by said driver means, a power transmission control device comprising means for selecting engine speed and throttle setting, means for maintaining corresponding optimum ignition settings for each throttle setting, and means for varying said gear ratio depending upon the speed of said engine.

2. In a variable gear ratio power transmission device comprising a prime mover, driver means motivated by said prime mover and driven means frictionally motivated by said driver means, a power transmission control device comprising means for selecting said prime mover speed, means for varying the gear ratio between said driver means and said driven means depending upon the speed of said prime mover, and means, dependent upon the desired prime mover speed and the gear ratio, for maintaining the friction pressure necessary for optimum frictional motivation of said driven means.

3. In a variable gear ratio power transmission device comprising a prime mover, driver means motivated by said prime mover, driven means frictionally motivated by said driver means, a power transmission control device comprising means for selecting said prime mover speed, means responsive to the speed of said prime mover, means for varying said gear ratio depending upon the speed of said prime mover and including said means responsive to said prime mover speed, and means, dependent upon the selected prime mover speed and the gear ratio, for maintaining the friction pressure necessary for optimum frictional motivation of said driven means.

4. The structure set forth in claim 3 wherein said means responsive to the speed of said prime mover is a governor.

5. The structure set forth in claim 3 wherein said means for maintaining the friction pressure necessary for optimum frictional motivation of said driven means includes fluid-actuated means.

6. The structure set forth in claim 3 wherein said means for varying said gear ratio is a fluid-actuated means.

7. In a variable gear ratio power transmission device comprising an internal combustion engine, driver means motivated by said engine, and driven means frictionally motivated by said driver means, a power transmission control device comprising means for selecting said engine speed and throttle setting, means for maintaining corresponding optimum ignition settings for each throttle setting, means for varying said gear ratio depending upon the speed of said engine, and means dependent upon the selected engine speed and the gear ratio, for maintaining the friction pressure necessary for optimum frictional motivation of said driven means.

8. The structure set forth in claim 7 wherein said means for varying said gear ratio comprises a screw jack.

9. In a variable gear ratio power transmission device in a motor vehicle having wheels equipped with hydraulic braking means, said power transmission device comprising an internal combustion engine driver means motivated by said engine and driven means frictionally motivated by said driver means, a power transmission control device comprising means for selecting said engine speed and throttle setting means for maintaining corresponding optimum ignition settings for each throttle setting, means for varying said gear ratio depending upon the speed of said engine, means dependent upon the selected engine speed and the gear ratio, for maintaining the friction pressure necessary for optimum frictional motivation of said driven means, and means, operable by said braking means, for reducing said throttle setting.

10. In a variable gear ratio power transmission device comprising a prime mover, driver pulleys motivated by said prime mover, and driven pulleys motivated by belts connected to said driver pulleys, a power transmission control device comprising means for selecting said prime mover speed, means for varying the position of said belt in said pulleys depending upon the speed of said prime mover, and fluid-actuated means, dependent upon the selected prime mover speed and the position of said belt in said pulleys, for maintaining an optimum ratio between the tension in the slack side of said belt as compared with the tension in said drive side of said belt.

11. In a transmission system, an engine having a fuel delivery means, a variable pulley driven by said engine, a belt for said pulley, a variable pulley driven by said belt, speed responsive means driven by the engine, a throttle lever connected to the fuel delivery means and to the speed responsive means the setting on both of which is changed when the throttle lever is actuated to produce a speed of rotation to the engine providing the most efficient operation thereof, means connecting said speed responsive means to said variable pulley driven by the engine to produce a reduction in the driving ratios between the pulleys with an increase in fuel delivery to reduce the load on the engine and permit it to immediately reach the proper increased speed for efficient operation, resulting in an increase in the speed of the speed responsive means which changes the driving ratio between the pulleys to a degree conforming to the delivered engine power and the load on the pulleys, spark control means on said engine, and means connecting said spark control means to said lever for changing the setting thereof when the lever is actuated.

12. In a transmission system, an engine having a fuel delivery means, a plurality of pulleys driven by said engine, a belt for each said pulley, a plurality of pulleys driven by said belt, speed responsive means driven by the engine, a throttle lever connected to the fuel delivery means and to the speed responsive means the setting on both of which is changed when the throttle lever is actuated to produce a speed of rotation to the engine providing the most efficient operation thereof, means connecting said speed responsive means to said plurality of pulleys driven by the engine to produce a reduction in the driving ratio between the plurality of pulleys with an increase in fuel delivery to reduce the load on the engine and permit it to immediately reach the proper increased speed for efficient operation, resulting in an increase in the speed of the speed responsive means which changes the driving ratio between the pulleys to a degree conforming to the delivered engine power and the load on the pulleys, a stub shaft connected to each of said pulleys driven by said belt, a gear box on each said shaft, and clutch means on each said shaft controlling the connection of the pulleys to the gear box.

13. In a transmission system, an engine having a fuel delivery means, a plurality of pulleys driven by said engine, a belt for each said pulley, a plurality of pulleys driven by said belt, speed responsive means driven by the engine, a throttle lever connected to the fuel delivery means and to the speed responsive means the setting on both of which is changed when the throttle lever is actuated to produce a speed of rotation to the engine providing the most efficient operation thereof, means connecting said speed responsive means to said plurality of pulleys driven by the engine to produce a reduction in the driving ratio between the plurality of pulleys with an increase in fuel delivery to reduce the load on the engine and permit it to immediately reach the proper increased speed for efficient operation, resulting in an increase in the speed of the speed responsive means which changes the driving ratio between the pulleys to a degree conforming to the delivered engine power and the load on the pulleys, a chassis frame on which said engine and pulleys are supported, a stub shaft connected to each of said pulleys driven by said belt, a reduction and reversing gear box on each said shaft, and clutch means on each said shaft controlling the connection of the pulleys to the gear box.

14. In a variable gear ratio power transmission device comprising a prime mover, driver pulleys motivated by said prime mover, and driven pulleys motivated by belts connected to said driver pulleys, a power tranmission control device comprising means for selecting said prime mover speed, means responsive to the speed of said prime mover, and means comprising a screw jack for varying the positions of said belts in said pulleys depending upon the speed of said prime mover and including said means responsive to said prime mover speed.

References Cited in the file of this patent

UNITED STATES PATENTS

| | | |
|---|---|---|
| Re. 19,681 | Hayes | Aug. 27, 1935 |
| Re. 23,356 | Aspinwall | Apr. 17, 1951 |
| 635,684 | Herschmann | Oct. 24, 1899 |
| 1,199,640 | Vincent | Sept. 26, 1916 |
| 1,367,306 | De Brun | Feb. 1, 1921 |
| 2,107,013 | Morgan | Feb. 1, 1938 |
| 2,129,400 | Blossfeld | Sept. 6, 1938 |
| 2,150,456 | Perrine | Mar. 14, 1939 |
| 2,197,807 | Magee | Apr. 23, 1940 |
| 2,378,375 | Abbott | June 19, 1945 |
| 2,378,549 | Gruenhagen | June 19, 1945 |
| 2,486,524 | Dulaney | Nov. 1, 1949 |

FOREIGN PATENTS

| | | |
|---|---|---|
| 333,120 | Italy | Dec. 19, 1935 |